Sept. 22, 1959 J. K. JACKSON 2,905,342
DELIVERY MECHANISM FOR ARTICLE PRINTING MACHINES
Filed Aug. 23, 1957 2 Sheets-Sheet 1
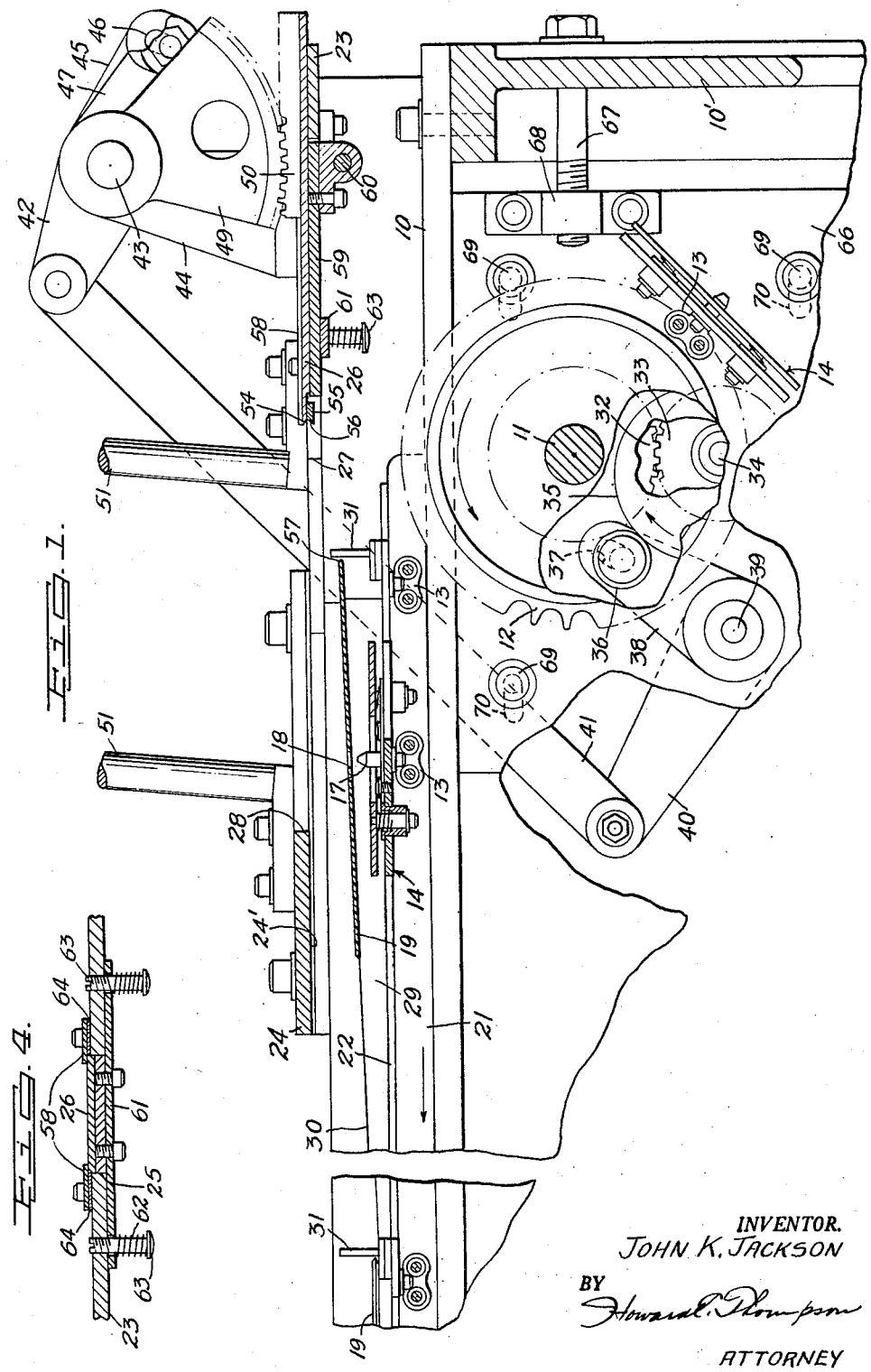
INVENTOR.
JOHN K. JACKSON
BY
Howard P. Thompson
ATTORNEY

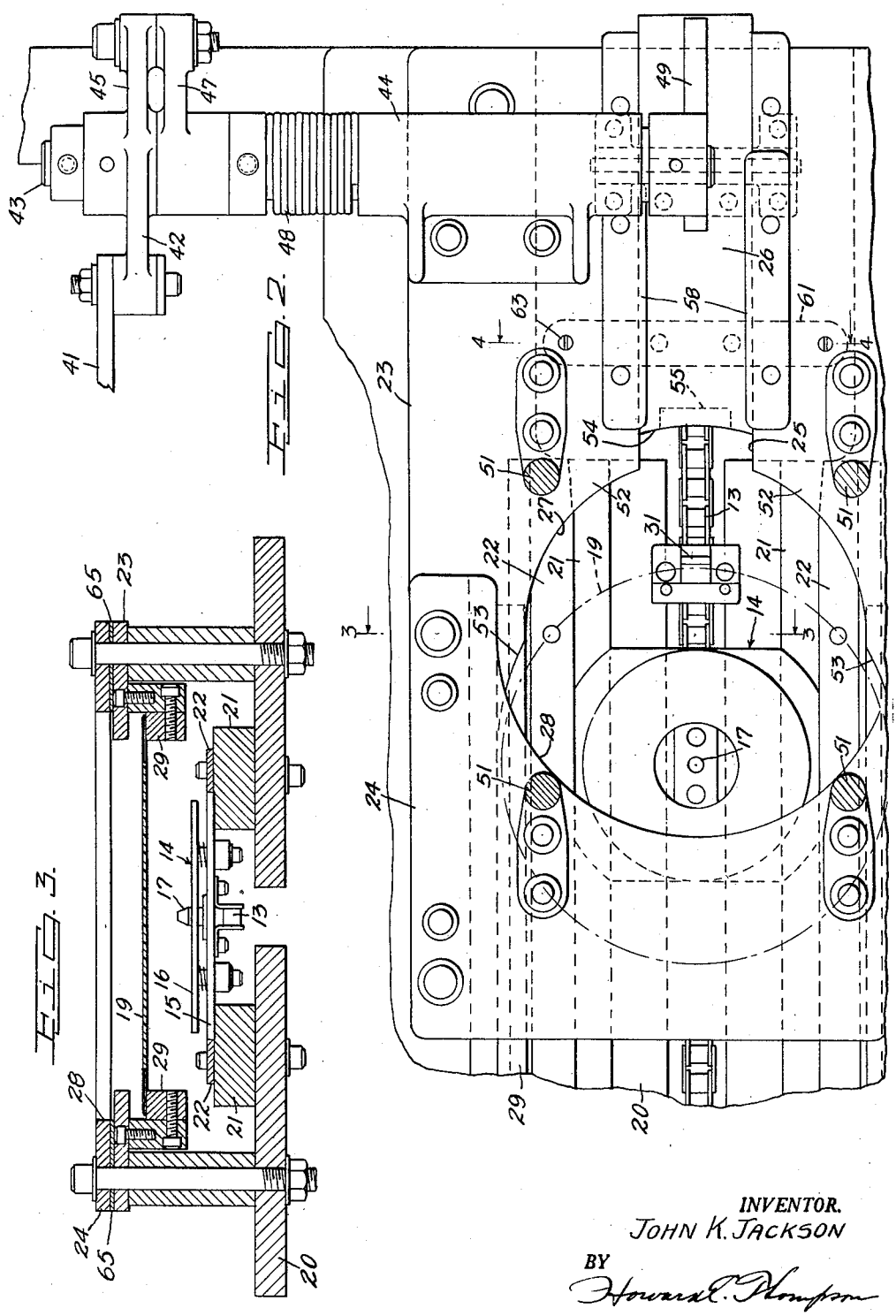

United States Patent Office 2,905,342
Patented Sept. 22, 1959

2,905,342

DELIVERY MECHANISM FOR ARTICLE PRINTING MACHINES

John K. Jackson, Westfield, N.J.

Application August 23, 1957, Serial No. 679,944

10 Claims. (Cl. 214—8.5)

This invention relates to machines for printing articles fed through a printing machine by a plurality of article supporting members spaced longitudinally of an endless feed chain. More particularly, the invention deals with the mechanism for delivering the articles to said article supporting members timely with positioning of said members at the delivery station.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a longitudinal sectional view through substantially the central portion of the delivery mechanism of a machine of the character described, with parts of the construction broken away and illustrating only a portion of the links of the drive chain.

Fig. 2 is a sectional plan view of the structure as seen in Fig. 1, with parts of the construction broken away and illustrating the position of the record shown in Fig. 1 in dot-dash lines.

Fig. 3 is a partial section on the line 3—3 of Fig. 2, illustrating the record; and Fig. 4 is a partial section on the line 4—4 of Fig. 2.

This application constitutes a continuation-in-part of my prior application Serial Number 537,671, filed September 30, 1955, and deals primarily with the delivery mechanism of the machine disclosed in said prior application.

In illustrating one adaptation and use of my invention, I have shown the delivery of records to the feed mechanism of the machine, preparatory to delivering the records to a printing station, as taught in said earlier application.

In the drawings, 10 represents part of the framework of a machine of the character described, in one end portion of which is mounted a drive shaft 11, to which is fixed a sprocket, shown, in part, at 12 in Fig. 1 of the drawing for driving an endless chain, parts of the links of which are indicated at 13 in Figs. 1 and 2.

Fixed to predetermined spaced links of the chain are article receiving and supporting members 14, two of which are indicated in Fig. 1 of the drawing, and one is shown partially in plan in Fig. 2 and also illustrated, in part, in Fig. 3 of the drawing. These members have bottom plates 15, to which the links are attached and yieldably supported on the bottom plates are upper plates 16, upon which the articles or records are adapted to rest in passage through the printing mechanism of the machine. The members 14 have, centrally thereof, upwardly projecting centering pins 17, which are adapted to enter apertures 18 in the articles or records 19, as the same are delivered onto the members 14 in passage through the delivery station or mechanism.

The frame of the machine includes a top plate 20, upon which are supported a pair of rails 21, note Fig. 3, which form supports for the members 14 in their passage through the machine. Guide rails 22, shown in section in Fig. 3, are employed to engage the bottom plate 15 of the members 14 for longitudinal alinement of the members in passage through the machine.

At the delivery end of the machine are supported upper plates 23 and 24, the plate 23 having a longitudinal aperture 25, in which an article or record feed element 26 is slidably mounted. The plate 23 has a semi-circular aperture 27 at the inner end of the aperture 25 and interrupted by said aperture 25 for clearance of a record delivered at the station, as later described. The plate 24 has a similar semi-circular opening 28 for the same purpose.

Supported in connection with the plate 23 at sides of the machine are rails, which are shown in section at 29 in Fig. 3 of the drawing and a broken side elevation of one of these rails is also illustrated in Fig. 1 of the drawing. The upper surface 30 of these rails are tapered downwardly from right to left, so that the article or record 19 can be gradually lowered for entrance of the pins 17 into the aperture 18. The article or record 19 is moved over the rails 29 by feed dogs 31 fixed to links spaced a predetermined distance in back of each of the members 14, as will clearly appear from a consideration of Fig. 1 of the drawing, the dogs being sufficiently high to engage the rear end of the article or record 19 for movement of the same over the inclined surfaces 30 of the rails 29.

On the shaft 11 is a gear, shown, in part, at 32, meshing with a pinion 33 on a cam shaft 34, the cam of which is indicated, in part, at 35. The cam operates upon a roller 36 adjustably supported in an elongated aperture 37 at the free end portion of a lever 38 fixed to a shaft 39 mounted in the frame.

Fixed to the shaft 39 outwardly of the frame is a lever 40, to the free end of which is pivoted a long link 41 pivoted to a lever 42 fixed to a shaft 43 mounted in a bearing 44 at the upper part of the machine.

The lever 42 has an extension 45, having an elongated aperture 46, note Fig. 1, for adjustable coupling of a tension lever 47 coupled with a spring, shown in Fig. 2 at 48, the spring having an engagement with the bearing 44 and with the lever 47 to, at all times, support the roller 36 in engagement with the cam 35.

Fixed to the shaft 43, centrally above the feed element 26, is a gear segment 49 operating upon a gear rack 50 fixed to the element 26. It will, thus, be apparent that, in the operation of the machine, the cam 35 will intermittently and timely advance the element 26 in picking up a lowermost article or record 19 supported within the four guide posts 51 at the delivery station, two of the posts being indicated, in part, in Fig. 1 and the four posts being shown, in section, in Fig. 2 of the drawing. No attempt has been made to illustrate the stack of records supported within the post, but it will be apparent that the lowermost record in the stack will be supported upon the surfaces 52 of the plate 23 closely adjacent the right-hand post 51, as viewed in Fig. 2 of the drawing and, as the records are advanced, they will clear the rounded ends 53 of the plate 23 and drop onto the rails 29, one of the records 19 being shown in its dropped position in Fig. 1 of the drawing.

The forward end of the feed element 26 is reduced and has a downwardly and rearwardly bevelled surface 54, note Fig. 1, which, in combination with a cross-strip 55 secured to the lower surface of the element 26 and having an upwardly bevelled forward surface 56, are curved to conform with the record contour and operate to engage the bevelled edge 57 of the record to positively engage said edge in the delivery feed of the record into the position shown in Fig. 1 of the drawing, where it has been released forwardly of the dog 31.

Supported upon the upper surface of the plate 23 and overlying the aperture 25 are two guide strips 58, shown in section in Fig. 4. These strips overlie the element 26 and retain the same against any upward movement, as the element is advanced in the delivery of a record.

Supported in the aperture 25 is a bottom supporting plate 59 for the element 26, the plate being fixedly pivoted, as seen at 60, and having, at its inner end, a supporting bar 61 movable downwardly against the action of springs 62 mounted on end pins 63, this structure being shown in sectional detail in Fig. 4 of the drawing.

It will thus be seen that, in the delivery movement of the element 26, the end portion thereof, having the strip 55 thereon, is capable of downward movement so that the element 26 can assume an angular position, thus avoiding the wiping of this element over the next adjacent lowermost record supported upon the plate 23, both in the delivery movement, as well as in the return movement of the element 26 to its normal position, as illustrated in Fig. 1 of the drawing. This operation avoids injury to the recording on the record, as will be apparent; the pivot 60 being directly below the shaft 43 will permit the tilting operation of the element 26, above mentioned, without interference with the operation of the segment 49. The tilting operation is due to the shifting of the weight of the operative parts and the added weight of the engaged record against the action of the light tensioned springs 62. In other words, the springs 62 are of sufficient tension to support the element 26 horizontally when the parts are in the retracted position, as shown in Fig. 1, preparatory to the feed stroke of the element 26.

It will appear, from a consideration of Fig. 4 of the drawing, that shims 64 are employed beneath the strips 58 for adjustment of thicknesses of articles or records or, in other words, the thickness dimension of the element 26 for engagement with such articles.

The operation of my improved delivery mechanism will be readily understood from the foregoing description, when taken in connection with the accompanying drawings and the following statement.

As the chain advances one of the members 14 to a position approaching the lower portion of the stack of articles or records positioned between the posts 51, the element 26 is timely advanced through operation of the cam 35 and, ultimately, the rack 49 through the link and lever mechanism described, so as to drop an article or record 19 onto the rails 29 above one of the members 14 and in advance of its associated feed dog 31, completion of which delivery is illustrated in Fig. 1. Promptly after this delivery, the rack 49 is returned to its normal stationary position shown in Fig. 1, preparatory for picking up the next successive article or record for delivery onto the next successive member 14 approaching the stack of records, as previously described.

As the next successive member 14 approaches the station, the previously delivered record is fed by the dog 31 along the rails 29 until the record 19 has been gradually lowered onto the member 14 with the pin 17 entering the aperture 18 of the record. In this operation, the record is freed of the dog 31, as indicated in part to the left of Fig. 1, and, as the members 14 feed longitudinally of the machine, they are supported upon the rails 21 and guided by the rails 22.

In the above described operation of delivering the record to the member 14, the innermost end of the record passes beneath the plate 24, clearing the aperture 28 and it will clearly appear, from a consideration of Fig. 1, that the lower surface 24' of the plate 24 is, at all times, slightly above the upper surface of the record, shims 65 being employed between the plates 23, 24, note Fig. 3, for this purpose and, when the shims 64 are changed, the shims 65 will be correspondingly changed to be consistent with the thickness of the article or record delivered by the delivery mechanism.

Considering Fig. 1 of the drawing, it will appear that the shafts 11 and 34 are mounted on an adjustable plate 66 adjusted through the medium of an adjustment screw 67 mounted in the end wall 10' of the frame and in threaded engagement with a bracket 68 fixed to the plate 66; several adjustable clamping screws or devices 69 operating in elongated apertures 70 in the frame will secure the plate 66 in different positions of adjustment. This adjustment is to maintain the chain taut at all times.

In the operation of coupling the article or record with the supporting member 14, the position of the pin 17 with respect to the dog 31 is such that, when the pin 17 enters the aperture 18, the article or record is moved away from the dog 31 a slight extent by passage of the record over the beveled top of the pin 17, as is evident from considering the lefthand portion of a part of one of the articles 19 and one of the dogs 31. The purpose of this is to definitely control the position of the article or record on the member 14 as it passes through the printing station.

Having fully described my invention, what I claim as new and desire to secure by Letters Patent is:

1. In machines of the class described employing an endless conveyor chain, having a plurality of article supporting members spaced longitudinally of and arranged directly thereon and article pickup dogs adjacent and spaced from each of said members, means providing an uninterrupted drive for said chain, a delivery station for delivering articles onto said members of the conveyor in passage through said station, a feed plate at said station, said plate having a forward edge, with means thereon conforming to an edge portion of an article positioned at the station in picking up said article for delivery onto an inclined article supporting surface at said station, means comprising a gear rack on said feed plate and a gear segment engaging said rack for reciprocating said plate in delivery of articles one at a time at said station, said dogs of the conveyor chain engaging the articles delivered to said inclined surface in advancing the articles over said surface to gradually lower the articles onto the supporting members adjacent said dogs, and cooperating means on said members and articles for definitely positioning the articles on said members in feeding the same through the machine by operation of said conveyor chain.

2. In machines of the class described employing an endless conveyor chain, having a plurality of article supporting members spaced longitudinally of and arranged directly thereon and article pickup dogs adjacent and spaced from each of said members, means providing an uninterrupted drive for said chain, a delivery station for delivering articles onto said members of the conveyor in passage through said station, a feed plate at said station, said plate having a forward edge, with means thereon conforming to an edge portion of an article positioned at the station in picking up said article for delivery onto an inclined article supporting surface at said station, means comprising a gear rack on said feed plate and a gear segment engaging said rack for reciprocating said plate in delivery of articles one at a time at said station, said dogs of the conveyor chain engaging the articles delivered to said inclined surface in advancing the articles over said surface to gradually lower the articles onto the supporting members adjacent said dogs, cooperating means on said members and articles for definitely positioning the articles on said members in feeding the same through the machine by operation of said conveyor chain, and means pivotally supporting said reciprocating feed plate to lower the article engaging forward edge thereof in the operation of advancing and retracting said plate.

3. In machines of the class described employing an endless conveyor chain, having a plurality of article supporting members spaced longitudinally of and arranged directly thereon and article pickup dogs adjacent and spaced from each of said members, means providing an uninterrupted drive for said chain, a delivery station for delivering articles onto said members of the conveyor in passage through said station, a feed plate at said station, said plate having a forward edge, with means thereon conforming to an edge portion of an article positioned at the station in picking up said article for delivery onto an inclined article supporting surface at said station, means comprising a gear rack on said feed plate and a gear segment engaging said rack for reciprocating said plate in delivery of articles one at a time at said station, said dogs of the conveyor chain engaging the articles delivered to said inclined surface in advancing the articles over said surface to gradually lower the articles onto the supporting members adjacent said dogs, cooperating means on said members and articles for definitely positioning the articles on said members in feeding the same through the machine by operation of said conveyor chain, means pivotally supporting said reciprocating feed plate to lower the article engaging forward edge thereof in the operation of advancing and retracting said plate, said last named means including means for yieldably urging the feed plate into engagement with a pair of guide plates, maintaining alinement of the feed plate with the lowermost article supported in a stack at said station.

4. In machines of the class described employing an endless conveyor chain, having a plurality of article supporting members spaced longitudinally of and arranged directly thereon and article pickup dogs adjacent and spaced from each of said members, means providing an uninterrupted drive for said chain, a delivery station for delivering articles onto said members of the conveyor in passage through said station, a feed plate at said station, said plate having a forward edge, with means thereon conforming to an edge portion of an article positioned at the station in picking up said article for delivery onto an inclined article supporting surface at said station, means comprising a gear rack on said feed plate and a gear segment engaging said rack for reciprocating said plate in delivery of articles one at a time at said station, said dogs of the conveyor chain engaging the articles delivered to said inclined surface in advancing the articles over said surface to gradually lower the articles onto the supporting members adjacent said dogs, cooperating means on said members and articles for definitely positioning the articles on said members in feeding the same through the machine by operation of said conveyor chain, means pivotally supporting said reciprocating feed plate to lower the article engaging forward edge thereof in the operation of advancing and retracting said plate, said last named means including means for yieldably urging the feed plate into engagement with a pair of guide plates, maintaining alinement of the feed plate with the lowermost article supported in a stack at said station, and means comprising a cam driven from a drive of the machine and a plurality of levers and links for actuating said gear segment.

5. In machines of the class described employing an endless conveyor chain, having a plurality of article supporting members spaced longitudinally of and arranged directly thereon and article pickup dogs adjacent and spaced from each of said members, means providing an uninterrupted drive for said chain, a delivery station for delivering articles onto said members of the conveyor in passage through said station, a feed plate at said station, said plate having a forward edge, with means thereon conforming to an edge portion of an article positioned at the station in picking up said article for delivery onto an inclined article supporting surface at said station, means comprising a gear rack on said feed plate and a gear segment engaging said rack for reciprocating said plate in delivery of articles one at a time at said station, said dogs of the conveyor chain engaging the articles delivered to said inclined surface in advancing the articles over said surface to gradually lower the articles onto the supporting members adjacent said dogs, cooperating means on said members and articles for definitely positioning the articles on said members in feeding the same through the machine by operation of said conveyor chain, means pivotally supporting said reciprocating feed plate to lower the article engaging forward edge thereof in the operation of advancing and retracting said plate, said last named means including means for yieldably urging the feed plate into engagement with a pair of guide plates, maintaining alinement of the feed plate with the lowermost article supported in a stack at said station, means comprising a cam driven from a drive of the machine and a plurality of levers and links for actuating said gear segment, and adjustable means in the link lever drive to control feed motion of said gear segment.

6. In machines of the character described, an article delivery station, means for supporting a stack of articles at said station, an endless drive chain having, spaced and mounted directly thereon, article supporting members and article pickup and feed dogs adjacent each member, means providing an uninterrupted drive for said chain, a pair of downwardly inclined rails at said delivery station, means comprising a reciprocating feed plate at said station for picking up and delivering articles one at a time from a stack onto said rails timely in advance of the dogs on said chain in the uninterrupted drive of said chain, said dogs engaging the articles in feeding the same along said rails to gradually lower the articles onto the supporting members positioned forwardly of said dogs, said members having projecting means entering apertures in the articles to definitely position the articles on said members and to free the articles from the adjacent dogs, and means, at said station and extending longitudinally of the drive chain and spaced from opposed sides thereof, for definitely alining said members in movement through the machine by said drive chain.

7. In machines of the character described, an article delivery station, means for supporting a stack of articles at said station, an endless drive chain having, spaced and mounted directly thereon, article supporting members and article pickup and feed dogs adjacent each member, means providing an uninterrupted drive for said chain, a pair of downwardly inclined rails at said delivery station, means comprising a reciprocating feed plate at said station for picking up and delivering articles one at a time from a stack onto said rails timely in advance of the dogs on said chain in the uninterrupted drive of said chain, said dogs engaging the articles in feeding the same along said rails to gradually lower the articles onto the supporting members positioned forwardly of said dogs, said members having projecting means entering apertures in the articles to definitely position the articles on said members and to free the articles from the adjacent dogs, means, at said station and extending longitudinally of the drive chain and spaced from opposed sides thereof, for definitely alining said members in movement through the machine by said drive chain, means for reciprocating said feed plate comprising a cam actuated link lever structure driving a gear segment operatively engaging said plate, and tensional means for maintaining the link lever structure in constant engagement with said cam.

8. In machines of the character described, an article delivery station, means for supporting a stack of articles at said station, an endless drive chain having, spaced and mounted directly thereon, article supporting members and article pickup and feed dogs adjacent each member, means providing an uninterrupted drive for said chain, a pair of downwardly inclined rails at said delivery station, means comprising a reciprocating feed plate at said station for picking up and delivering articles one at a time from a stack onto said rails timely in advance of the dogs on said chain in the uninterrupted drive of said chain, said dogs engaging the articles in feeding the same along said rails to gradually lower the articles onto the supporting members positioned forwardly of said dogs, said members having projecting means entering apertures in the articles to definitely position the articles on said members and to free the articles from the adjacent dogs, means, at said station and extending longitudinally of the drive chain and spaced from opposed sides thereof, for definitely alining said members in movement through the machine by said drive chain, means for reciprocating said feed plate comprising a cam actuated link lever structure driving a gear segment operatively engaging said plate, tensional means for maintaining the link lever structure in constant engagement with said cam, means adjusting the link lever structure to control the feed operation of said gear segment, and means pivotally and yieldably supporting said plate to swing in the direction of delivery of the article at said station.

9. In machines of the character described, an article delivery station, means for supporting a stack of articles at said station, an endless drive chain having, spaced and mounted directly thereon, article supporting members and article pickup and feed dogs adjacent each member, means providing an uninterrupted drive for said chain, a pair of downwardly inclined rails at said delivery station, means comprising a reciprocating feed plate at said station for picking up and delivering articles one at a time from a stack onto said rails timely in advance of the dogs on said chain in the uninterrupted drive of said chain, said dogs engaging the articles in feeding the same along said rails to gradually lower the articles onto the supporting members positioned forwardly of said dogs, said members having projecting means entering apertures in the articles to definitely position the articles on said members and to free the articles from the adjacent dogs, means, at said station and extending longitudinally of the drive chain and spaced from opposed sides thereof, for definitely alining said members in movement through the machine by said drive chain, means for reciprocating said feed plate comprising a cam actuated link lever structure driving a gear segment operatively engaging said plate, tensional means for maintaining the link lever structure in constant engagement with said cam, means adjusting the link lever structure to control the feed operation of said gear segment, means pivotally and yieldably supporting said plate to swing in the direction of delivery of the article at said station, and said plate having, at its article engaging edge, means for conforming said edge with the contour of that part of the article engaged thereby.

10. In a machine of the character described, having an article delivery station supporting a stack of articles one upon another, an article pickup and delivery element at said station, means normally maintaining said element in alinement with the lowermost article in a stack, means for actuating said element to pick up the lowermost article at a stack for delivery at said station, and means movably and yieldably supporting said element to move the forward edge thereof downwardly and angularly to the lower surface of other articles supported in said stack in the delivery stroke and return stroke of said element with respect to the supported articles in the stack.

References Cited in the file of this patent

UNITED STATES PATENTS

| 1,266,734 | White | May 21, 1918 |
| 1,441,196 | Freedman | Jan. 2, 1923 |
| 2,264,738 | Blann | Dec. 2, 1941 |